United States Patent [19]

Priola et al.

[11] 4,348,427

[45] Sep. 7, 1982

[54] COATING METHOD AND COMPOSITION

[75] Inventors: Aldo Priola; Giampaolo Giuliani, both of San Donato Milanese, Italy

[73] Assignee: ANIC, S.p.A., Palermo, Italy

[21] Appl. No.: 167,701

[22] Filed: Jul. 11, 1980

[30] Foreign Application Priority Data

Aug. 10, 1979 [IT] Italy ................................. 25050 A/79

[51] Int. Cl.$^3$ .............................................. B05D 3/06
[52] U.S. Cl. .................................. 427/44; 204/159.16; 427/54.1; 525/920; 525/922; 526/264; 526/276; 526/278
[58] Field of Search ...................... 204/159.16, 159.15; 526/264, 276, 288, 303; 525/46; 427/44, 54.1

[56] References Cited

U.S. PATENT DOCUMENTS

| 3,001,967 | 9/1961 | Willersinn | 525/46 |
| 3,022,264 | 2/1962 | Stanton et al. | 204/159.16 |
| 3,870,768 | 3/1975 | Blackwood et al. | 204/159.16 |
| 4,205,139 | 5/1980 | Barzynski et al. | 204/159.22 |

Primary Examiner—John H. Newsome
Attorney, Agent, or Firm—Morgan, Finnegan, Pine, Foley & Lee

[57] ABSTRACT

A method for coating various surfaces is disclosed, which comprises the step of preparing a mixture composed by at least one compound such as an epoxy-acrylic resin, a polyester alpha-omega-acrylate resin, an unsaturated polyester resin, or a urethane-acrylate resin and by at least one unsaturated compound of the amide, lactam, piperidone and urea classes and using said mixture for compounding a varnish to be applied to the selected substrate and then irradiated with an appropriate radiation (range 200 to 400 nm wavelength).

2 Claims, 2 Drawing Figures

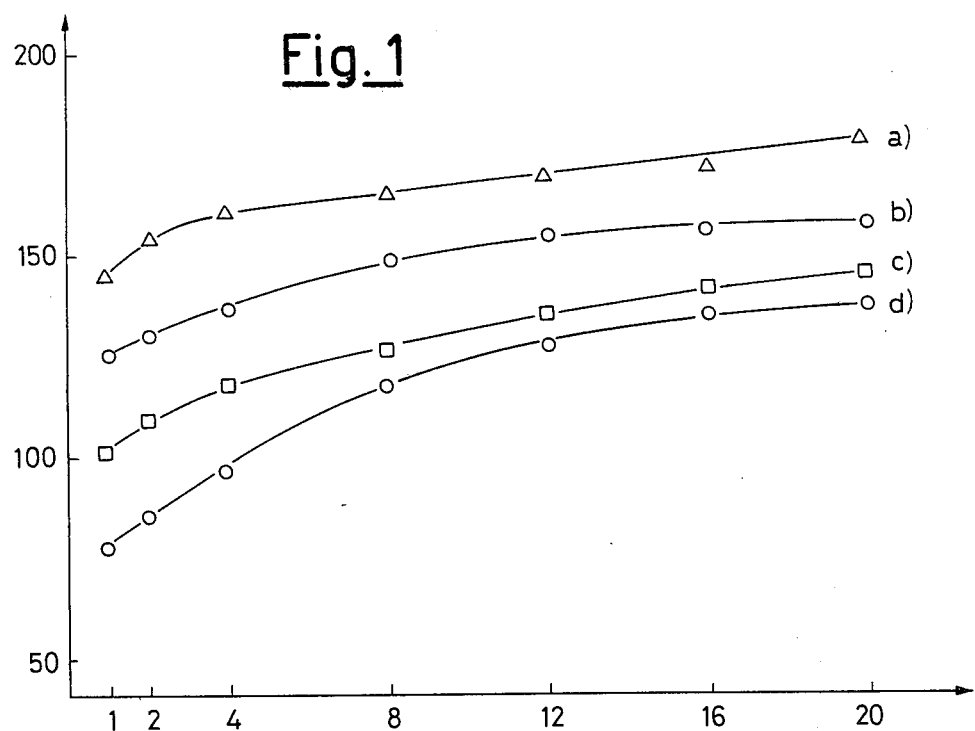
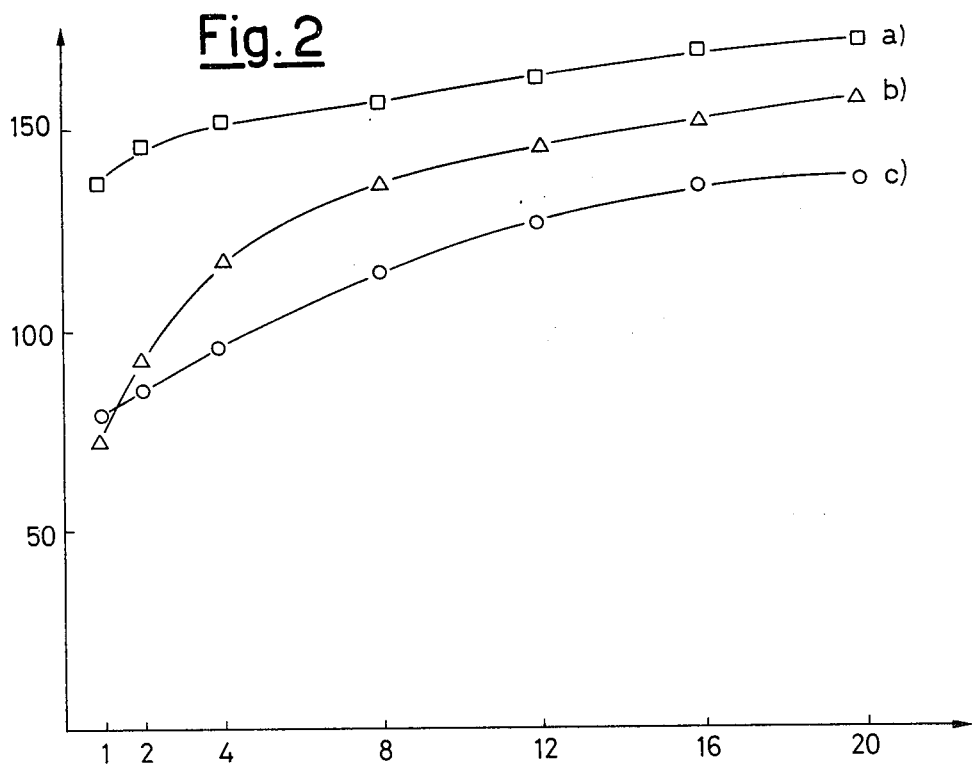

COATING METHOD AND COMPOSITION

This invention relates to a method for coating various surfaces with materials prepared by the cross-linkage, by means of radiation, of suitable compositions based on oligomers pertaining to the polyester, epoxy resin or urethane resin class, and compounds pertaining to the N-vinylamide class. The present invention also relates to the mixtures themselves. Recently, new types of solvent-less paints have become commercially available, which can be cross-linked by means of radiation, and in particular by means of UV radiation. Their use is becoming increasingly widespread as a consequence of the advantages which the method brings, namely the elimination of solvents and thus of the relative atmospheric pollution, a lower energy consumption for the cross-linking and a higher curing speed of the film. The fields of application relate mainly to the painting of wood, plastics materials, and paper, and the preparation of inks and adhesives.

The products used generally consist of oligomers pertaining to the polyester, epoxy resin and urethane resin class, and generally contain two terminal acrylic double bonds for each molecule.

Although these products are of low molecular weight, they are all of high viscosity, and it is impossible to apply them directly to the various substrates by the usual application methods. In order to reduce the viscosity of the various oligomers and to obtain mixtures having rheological characteristics such as to make them suitable for the various applicational methods, various types of reactive diluents are used such as butylacrylate, ethylhexylacrylate, styrene, methylmethacrylate, hydroxyethylacrylate and hydroxyethylmethacrylate.

It has been discovered that when used as reactive diluents, these products are the main reasons for the unpleasant odour, the toxic properties and the irritating power which the mixtures often present. This is both because of the volatility of certain of these products and because of their irritating power to the skin when they come in contact therewith. Consequently, a considerable step forward in the further development of paints which can be cross-linked by radiation would be represented by the use of new reactive diluents having low volatility and a low irritating power, which would enable the toxicological problems connected with the use of these mixtures to be greatly reduced. In a recent U.S. Pat. No. 3,874,906), it has been proposed to use N-vinylpyrrolidone as a reactive diluent for UV crosslinkable resins. This has a lower toxicity than the mixtures, and enables a high cross-linkage rate to be obtained. On the other hand, the use of N-vinylpyrrolidone as a reactive diluent has the drawback of imparting hydrophilic properties connected with the nature of the monomer to the film, because of which the film is poorly resistant to humidity, and swells in water.

The applicant has now established a method for coating various surfaces with materials prepared by cross-linking (by means of radiation) compounds formed by the union of at least one component chosen from the following classes:

(a) epoxy-acrylic resins (products of addition of acrylic acid to epoxy resins);
(b) polyester-α-ω-acrylate resins (prepared by esterifying hydroxylated polyester resins with acrylic acid);
(c) unsaturated polyester resins (prepared for example by condensing glycols with a mixture of saturated dicarboxylic acids (phthalic acid) and unsaturated dicarboxylic acids (maleic and fumaric acid);
(d) urethane-acrylate resins prepared by the addition of hydroxyethylacrylate to α,ω-diisocyanates, with at least one component chosen from compounds corresponding to the following general formula:

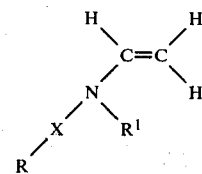

where:

X is —CO—, —SO$_2$— or

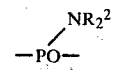

R can be a linear or branched aliphatic, alicyclic or aromatic alkyl group with 1 to 18 carbon atoms, or can be equal to the group NR$_2$;

R$^1$ is a group analogous to R and equal to or different from it, and R and R$^1$ can also be connected together with the formation of a ring. In this case, the atoms which constitute the ring can vary from 6 to 14 in number. R$^2$ is a group analogous to R.

Some examples of these compounds are: N-vinylmethylbutyramide, N-vinylmethylbenzamide, N-vinylmethylacetamide, N-vinylpropylacetamide, N-vinylphenylacetamide, N-vinylcaprolactam, N-vinyl-2-piperidone, N-vinylmethyl-N'-dimethylurea, N-vinylbutyl-p-toluenesulphonamide, N-vinyl-N-methyl-p-toluenesulphonamide, N-vinylmethyl-N$^1$-dimethyl-N$^2$-dimethylphosphoramide, or N-vinylmethylisobutyramide.

Said compounds are miscible in all proportions with the resins of the said classes a), b), c), even though they are preferably used in a quantity of 4 to 70% by weight with respect to said resins.

The mixtures according to the present invention also have the following advantages over the known art:
absence of unpleasant odour
high curing rate
low volatility
low irritating power
high fluidity
improved mechanical properties of the film
limited water absorption by the film.

The method according to the present invention consists of coating the surfaces concerned with a layer of mixtures obtained as described heretofore, then irradiating said layer with suitable radiation.

The radiation used generally has a wavelength of 200 to 400 nm and can be easily obtained using low, medium or high pressure mercury vapour lamps.

In the case of UV radiation (lying within the aforesaid range), a photoinitiator must be added able to lead to the formation of free radicals.

Typical photoinitiators used are benzoinmethylether, benzoinisopropylether, benzophenone, benzil, acetophenone, 2,2-dimethyl-2-phenylacetophenone, 2-chlorothioxanthone, and anthraquinone.

Other types of high energy radiation (electrons, X-rays etc.) can also be used.

The present invention also relates to the mixtures composed as heretofore described. The characterising element of said mixtures is the use of monomers corresponding to the formula:

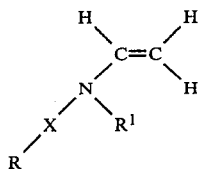

as heretofore defined.

The positive outcome of the use of said monomers in crosslinkable mixtures was not predictable on the basis of the known art (see U.S. Pat. No. 3,874,906).

In this respect, the reactivity of our monomers is generally different from that of N-vinylpyrrolidone. Consequently, the application of the materials according to the present invention in the field of systems crosslinkable by radiation could not be predicted.

This fact can be proved by the following data, all taken from polymerisation experiments, from which the difference between the behaviour of our materials and of N-vinylpyrrolidone can be noted.

Radical polymerisation: monomer dissolved to the extent of 25% in dioxane, with azobisdiisobutyronitrile added (1% by weight with respect to the monomer) and kept at 70° C. for 2 hours in a $N_2$ atmosphere.

|  | Polymer conversion % |
|---|---|
| N-vinylpyrrolidone | 100 |
| N-vinylmethylacetamide | 0 |
| N-vinylbutyltoluenesulphonamide | 0 |
| N-vinylcaprolactam | 10 |

Cationic polymerisation: monomer dissolved to the extent of 10% in $CH_2Cl_2$, with $BF_3OEt_2$ added (5% by weight with respect to the monomer) and kept under $N_2$ for 30 minutes at +20° C.

|  | Polymer conversion % |
|---|---|
| N-vinylpyrrolidone | 0 |
| N-vinylmethylacetamide | 0 |
| N-vinylbutyltoluenesulphonamide | 100 |
| N-vinylcaprolactam | 0 |

On the basis of the above data it is apparent that there is no similarity in behaviour between N-vinylpyrrolidone and the compounds the use of which is described by us.

Examples of application of these mixtures are as products for UV cross-linkable lacquers or paints, in particular paints for wood, for plastics material, for printing tin plate, inks, adhesives etc. They can also be used in the field of printed circuits, records, and paints for floors.

Some examples are given hereinafter relative to certain products prepared and subjected to UV cross-linkage. They are not to be considered limiting in that numerous modifications are possible for specific uses.

In the drawing, FIGS. 1 and 2 illustrate the rate of cross-linking for various compositions according to the invention.

EXAMPLE 1

An epoxy-acrylic resin (resin A) is used, prepared by adding two molecules of acrylic acid to bisphenol-A-diglycidyl-ether. The product has a $\eta^{25°\ C.}$ of 57,000 Poises (measured by a Weissemberg Rheogonometer), an acidity No. of 2.1, and a volatility of 0 (% of volatile product measured by keeping the product in an oven for two hours at 60° C.).

The resin A is diluted with 10% by weight of the following monomers:
1 N-vinylmethylacetamide
2 N-vinylcaprolactam
3 N-vinyl-N-butyl-p-toluenesulphonamide. These monomers were prepared by vinylation of the corresponding secondary amides under the following conditions:

| Monomer | T (°C.) | Time (hours) | Yield (%) | B.P. |
|---|---|---|---|---|
| 1 | 190 | 5 | 55 | 80–85° C. at 10 Torr |
| 2 | 130 | 8 | 60 | 85–90° C. at 1 Torr |
| 3 | 180 | 15 | 70 | 125–130° C. at 0.1 Torr |

The viscosity of the mixtures of monomers 1, 2, 3 with resin A is 1,520, 5,700 and 16,700 Poises respectively. 5% by weight of 2,2-dimethoxy-2-phenylacetophenone ($C_6H_5$—CO—C ($OCH_3$)$_2C_6H_5$) was added to these mixtures, which were perfectly odourless, and the mixtures were then spread on carefully degreased and sand-blasted steel plates, to give a film having a thickness of about 50μ. A Hildebrand mercury vapour lamp of medium pressure with a power of 80 Watts/cm was used for the cross-linking, and was mounted on a belt rotating at a speed of 24 m/min and disposed at a distance of 24 cm from it. The cross-linking speed was determined by hardness measurements using the Konig pendulum, and the variation of this quantity with the number of passages is shown in FIG. 1 for resin A used alone and for the three said mixtures.

In FIG. 1, the abscissa represents the number of passages and the ordinate the values of $H_K$ (hardness index for the material by the Konig method). Said FIG. 1 relates to mixtures in which the resin/diluent ratio is 90 parts to 10.

Curve (a) relates to the mixture of resin A+vinylmethylacetamide.

Curve (b) relates to the mixture of resin A+vinylbutyltoluenesulphonamide.

Curve (c) relates to the mixture of resin A+vinylcaprolactam.

Curve (d) relates to resin A alone.

It can be clearly seen from the data of FIG. 1 that the cross-linkage rate for the mixtures is higher than that for resin A used alone, and the final hardness value of the crosslinked film is also higher.

With regard to the other mechanical properties of the film, the following measurements were made: adhesion to the substrate (by means of chequering) flexibility on a conical mandrel impact strength (G.E. impact flexibility tester).

These properties were very similar to those of the pure resin A. Measurements of the % gel carried out by extracting with $CH\ Cl_3$ for 24 hours at ambient temperature showed 100% of insoluble product for all the experiments after 20 passages. The volatility (% loss in weight of the product after 2 hours in an oven at 60° C.) of the monomers used, when compared with that of N-vinylpyrrolidone, had the following values:

| | |
|---|---|
| N-vinylpyrrolidone | 100% |
| N-vinylmethylacetamide | 100% |
| N-vinylcaprolactam | 50% |
| N-vinylbutyl-p-toluenesulphonamide | 1.3% |

It can therefore be seen that by increasing the length of the alkyl group it is possible to reduce the volatility of the product to a very low value.

EXAMPLE 2

Mixtures were prepared of the same epoxy-acrylic resin (resin A) with N-vinylmethylacetamide and with N-vinylcaprolactam using 30% by weight of diluent.

The viscosity of the mixtures obtained was considerably reduced:
with N-vinylmethylacetamide = 11 Poises
with N-vinylcaprolactam = 91 Poises.

5% of the same initiator as in Example 1 was added to these mixtures, which were then spread over plates and cross-linked in air under the same conditions as in Example 1.

FIG. 2 shows the variation of the Konig hardness for the two mixtures, compared with that of the pure product. It can be seen that the cross-linkage rate clearly increases in the presence of the diluent, as does the final hardness of the cross-linked film.

In FIG. 2, the abscissa represents the number of passages and the ordinate the quantities already defined for FIG. 1. Said figure relates to mixtures having a resin/diluent ratio of 70 parts to 30.

Curve (a) relates to a mixture of resin A and vinylcaprolactam.

Curve (b) relates to a mixture of resin A and vinylmethylacetamide.

Curve (c) relates to resin A used alone.

With regard to the other mechanical properties, an increase in film adhesion and flexibility is noted.

| | Resin A alone | + monomer 1 | + monomer 2 |
|---|---|---|---|
| Adhesion (%) | 10-20 | 30-40 | 20-30 |
| Flexibility (%) | 0 | 2 | 1 |

Measurements of the % gel carried out on the films after 20 passages showed 100% of insoluble product in each case.

EXAMPLE 3

Operating by the same method as described in Example 1, mixtures were made containing 10% by weight of the same reactive monomers as Example 1, and a urethane-acrylate resin prepared by condensing 1 molecule of hexamethylenediisocyanate with 2 molecules of trimethylolpropanediacrylate. This resin (resin B) has the following characteristics: η135 Poises; acrylic functionality 4.

The viscosity of the mixtures obtained is as follows:
Mixture monomer 1 = 14 Poises
Mixture monomer 2 = 41 Poises
Mixture monomer 3 = 57 Poises.

After adding 5% of the same initiator as in Example 1, the mixtures obtained were cross-linked as described in Example 1, and the variation in the Konig hardness with the number of passages was analogous to that shown in FIG. 1.

The final hardness after 20 passages was as follows:

| | |
|---|---|
| Resin B pure | Konig hardness 150 |
| Resin B + mon. 1 | Konig hardness 170 |
| Resin B + mon. 2 | Konig hardness 165 |
| Resin B + mon. 3 | Konig hardness 160 |

Measurements of the % gel carried out on the films after 20 passages showed 100% of insoluble product in each case.

EXAMPLE 4

Mixtures were prepared of the same urethane-acrylate resin (resin B) with N-vinylmethylacetamide and with N-vinylcaprolactam using 30% by weight of diluent.

The viscosity of the mixtures obtained was as follows:
with N-vinylmethylacetamide = 1.5 Poises
with N-vinylcaprolactam = 6.5 Poises These mixtures were cross-linked after adding 5% by weight of the same initiator as in Example 1 and under the same conditions as in Example 1, to show a variation in the Konig hardness analogous to that shown in FIG. 2.

The final hardness after 20 passages was as follows:

| | |
|---|---|
| Resin B pure | Konig hardness 150 |
| Resin B + mon. 1 | Konig hardness 173 |
| Resin B + mon. 2 | Konig hardness 160 |

The % gel after 20 passages was 100% in each case. Certain mechanical properties showed a significant increase as a result of the use of the various diluents:

| | Resin B alone | + monomer 1 | + monomer 2 |
|---|---|---|---|
| Adhesion (%) | 0 | 20-30 | 80-90 |
| Flexibility (%) | 0 | 1 | 2 |

EXAMPLE 5

50/50 and 70/30 weight/weight mixtures were prepared of resin A (epoxy-acrylate) and N-vinylcaprolactam, 3% by weight of benzoinethylether being added to the mixtures. The mixtures were cross-linked by the method described in Example 1, to give films, after 20 passages, having a Konig hardness of 152 and 170 respectively, these being completely cross-linked as shown by the measurement of the % gel.

Analogous films were prepared and cross-linked under the same conditions using a 50/50 and 70/30 weight/weight mixture of resin A and N-vinylpyrrolidone. The absorption of $H_2O$ by the films was measured (as percentages increase in weight after 24 hours at 60° C. in $H_2O$). The results obtained were as follows:

| | |
|---|---|
| 50/50 mixture with N-vinylcaprolactam: | $H_2O$ absorption 4.3% |
| 70/30 mixture with N-vinylcaprolactam: | $H_2O$ absorption 4.2% |
| 50/50 mixture with N-vinylpyrrolidone: | $H_2O$ absorption 9.3% |
| 70/30 mixture with N-vinylpyrrolidone: | $H_2O$ absorption 6.6% |

EXAMPLE 6

A polyester-acrylate resin (resin C) was used, prepared by condensing two molecules of phthalic anhydride with three molecules of diethyleneglycol, then acrylating the two terminal hydroxyl groups with acrylic acid. The product had the following characteristics: viscosity at 25° C.=3,000 Poises; acid No.=2.5; acrylic functionality=2. It was diluted 50/50 weight/weight with N-vinylmethylacetamide to give a mixture having a viscosity of 2.6 Poises.

3% of benzoinisopropylether was added to this mixture, which was then subjected to UV cross-linkage under the same conditions as given for Example 1. The progress of the cross-linkage of this mixture compared with that of the pure resin C was faster, as shown by the Konig hardness value, which varied in a manner similar to that described in FIG. 2. After 20 passages, the mixture had a Konig hardness of 150, whereas the pure resin had a hardness of 128. Both products were completely cross-linked, as shown by % gel measurements.

The mechanical properties of the mixture were slightly better than those of the pure resin C.

EXAMPLE 7

Operating in a manner analogous to that described for the other monomers, N-vinylethylbenzamide was prepared (yield 20%), this being in the form of a liquid having a B.P. of 70°-75° C. at 0.2 Torr. This monomer was mixed to the extent of 30% by weight with the epoxy-acrylic resin (resin A), and subjected to UV cross-linkage under the same conditions given for Example 1 after adding 3% by weight of benzoinethylether. The cross-linkage behaviour of the monomer was similar to that of the N-vinylmethylacetamide in Example 3, giving a product which was completely cross-linked, with good mechanical characteristics and with very low water absorption (3% after 24 hours at 60° C.).

EXAMPLE 8

Using the same procedure as described in Example 1, N-vinylmethylisobutyramide was prepared (yield 80%), in the form of a liquid having a B.P. of 80°-85° C. at 20 Torr. The mixture was mixed to the extent of 38% by weight with resin A to give a mixture having a viscosity of 18 Poises at 25° C., this being then subjected to UV cross-linkage under the same conditions as given in Example 1 after adding 3% by weight of benzoinethylether. Its cross-linkage behaviour was similar to that of the N-vinylethylbenzamide of the preceding Example.

EXAMPLE 9

Operating as described in Example 1 relative to the monomer 3, N-vinylmethyl-p-toluenesulphonamide was prepared in the form of a product having a B.P. of 85°-90° C. at 0.2 Torr (yield 80%). The monomer was subjected to UV cross-linkage in a 30% weight mixture with resin A in the presence of 3% by weight of benzoinethylether, its cross-linkage behaviour being better than that of resin A alone, and showing a very low water absorption by the film (2.8% after 24 hours at 60° C.).

We claim:

1. A method for covering various surfaces consisting of applying to said surfaces a layer of material constituted by a mixture of at least one compound chosen from the following classes:
   (a) epoxy-acrylic resins
   (b) urethane-acrylate resins and at least one monovinylic compound chosen from those corresponding to the following formula:

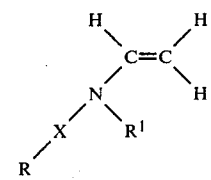

in which X can be —CO—, —SO$_2$— or

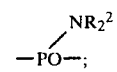

R can be a linear or branched aliphatic, alicyclic or unsubstituted aromatic alkyl group with 1 to 18 carbon atoms or can be equal to the group —NR$^2{}_2$; and R$^1$ and R$^2$ are groups analogous to R and can be equal to or different from it, R and R$^1$ also being able to be connected together to form a ring, in which case the number of atoms in the ring can vary from 6 to 14; and irradiating the previously obtained layer of material with radiations having a wavelength of between 200 and 400 nanometers, X-rays or electron beams.

2. Materials suitable for coating various surfaces prepared by the cross-linkage, by means of radiation, of materials constituted by a mixture of at least one compound chosen from the following classes:
   (a) epoxy-acrylic resins
   (b) urethane-acrylate resins and at least one monomer compound chosen from those corresponding to the following formula:

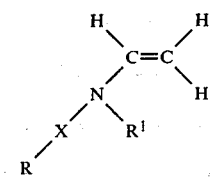

in which X can be —CO—, —SO$_2$— or

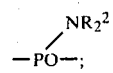

R can be a linear or branched aliphatic, alicyclic or unsubstituted aromatic alkyl group with 1 to 18 carbon atoms or can be the group NR$^2{}_2$; and R$^1$ and R$^2$ are groups analogous to R, and equal to or different from it, R and R$^1$ also being able to be connected together to form a ring, in which case the carbon atoms constituting the ring can vary from 6 to 14 in number.

* * * * *